(12) United States Patent
Tseng (10) Patent No.: US 9,642,425 B2
(45) Date of Patent: May 9, 2017

(54) PACKAGING BOX FOR ELECTRONIC DEVICE

(71) Applicant: FIH (Hong Kong) Limited, Kowloon (HK)

(72) Inventor: Chien-Feng Tseng, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 519 days.

(21) Appl. No.: 14/224,956

(22) Filed: Mar. 25, 2014

(65) Prior Publication Data

US 2015/0060310 A1   Mar. 5, 2015

(30) Foreign Application Priority Data

Aug. 28, 2013   (TW) .............................. 102130834 A (51) Int. Cl.
| | | |
|---|---|---|
| *A45C 11/00* | (2006.01) | |
| *H04B 1/3888* | (2015.01) | |
| *B65D 81/113* | (2006.01) | |
| *B65D 5/52* | (2006.01) | |

(52) U.S. Cl.
CPC .............. *A45C 11/00* (2013.01); *B65D 5/526* (2013.01); *B65D 5/5213* (2013.01); *B65D 81/113* (2013.01); *H04B 1/3888* (2013.01); *A45C 2011/002* (2013.01); *A45C 2200/15* (2013.01)

(58) Field of Classification Search
CPC  B65D 5/5213; B65D 43/161; B65D 77/0433; B65D 81/113; B65D 85/00; A45C 2200/15; A45C 2011/002
USPC ... 206/45.2–45.23, 320, 372, 379, 443, 576; 220/4.22–4.24; 211/70.6
See application file for complete search history.

(56) References Cited

U.S. PATENT DOCUMENTS

| | | | | |
|---|---|---|---|---|
| 2,657,793 A | * | 11/1953 | Goldshine ............ | B65D 5/5213 206/6.1 |
| 3,442,371 A | * | 5/1969 | Deshong ................ | B65D 11/00 206/45.23 |
| 5,007,530 A | * | 4/1991 | Weismantel ......... | B65D 5/5206 206/45.23 |
| 7,318,521 B2 | * | 1/2008 | Lau ........................ | A45C 11/00 206/320 |
| 7,735,644 B2 | * | 6/2010 | Sirichai ..................... | A45F 5/02 206/320 |
| 7,780,010 B2 | * | 8/2010 | Kinuhata ............... | B65D 5/504 206/485 |
| D690,059 S | * | 9/2013 | Robbins ....................... | D30/161 |
| 2012/0048757 A1 | * | 3/2012 | Ohsawa .................... | A45C 5/02 206/320 |
| 2013/0098789 A1 | * | 4/2013 | Jun ...................... | B65D 5/5213 206/320 |

* cited by examiner

*Primary Examiner* — J. Gregory Pickett
*Assistant Examiner* — Brijesh V. Patel
(74) *Attorney, Agent, or Firm* — Steven Reiss (57) ABSTRACT

A packaging box includes a box and a main cover connected to the box. The box defines a receiving chamber configured to receive an electronic device. The main cover comprises a first board, a second board, and a third board. The first board is connected to the box. The first, second, and third boards are foldable relative to each other. The main cover is foldable to package the box, or to support the box with an angle formed between the first board and the box, and one side of the box resisting against the third board.

18 Claims, 9 Drawing Sheets

PACKAGING BOX FOR ELECTRONIC DEVICE

BACKGROUND

1. Technical Field

The disclosure generally relates to packaging boxes, and particularly to a packaging box for electronic devices.

2. Description of Related Art

To prevent fragile precision electronic devices, such as mobile phones, from being damaged during transportation, the electronic devices are packaged in boxes before shipment. However, most of the boxes are discarded after users buy the electronic devices, so the boxes are wasted.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the disclosure.

DETAILED DESCRIPTION

Figure 1:
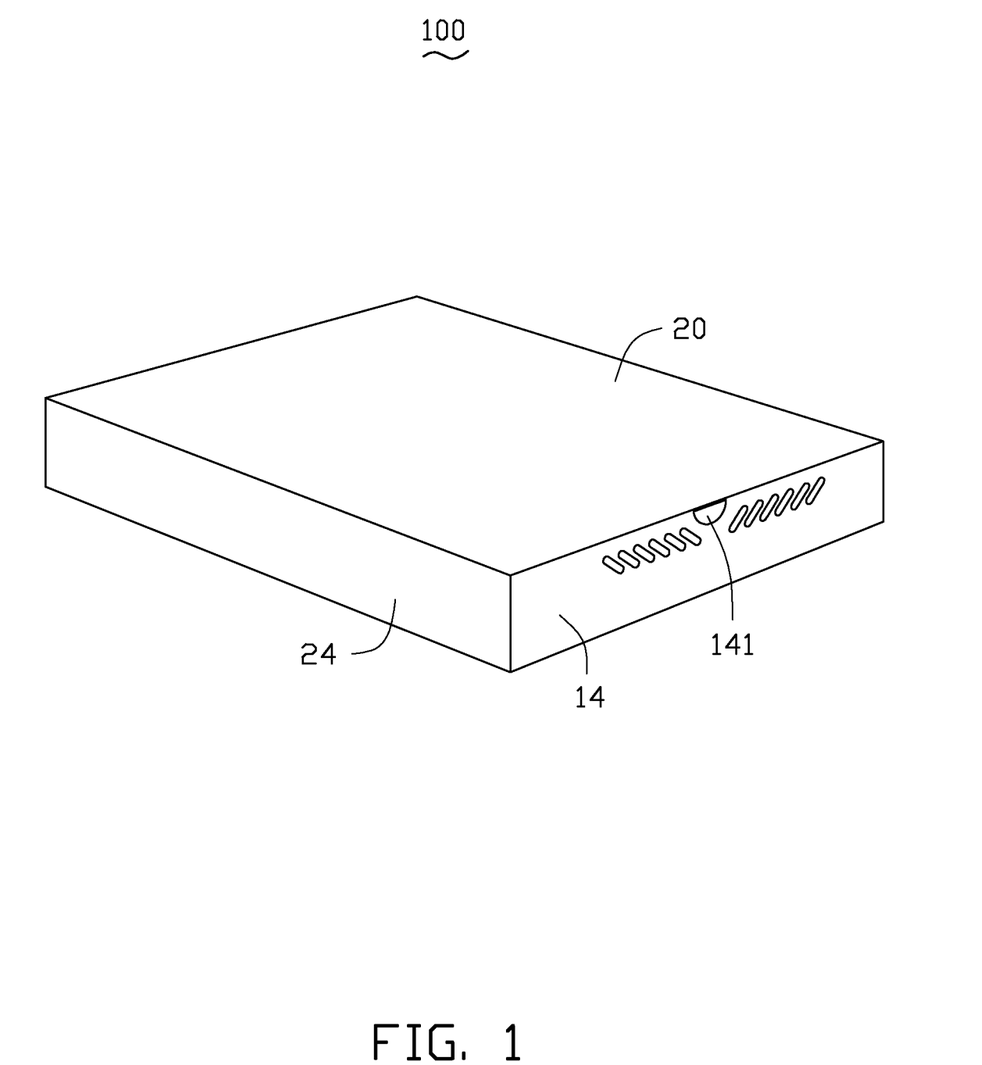
FIG. 1 is a schematic view of an embodiment of a packaging box in a closed state.
Figure 2:
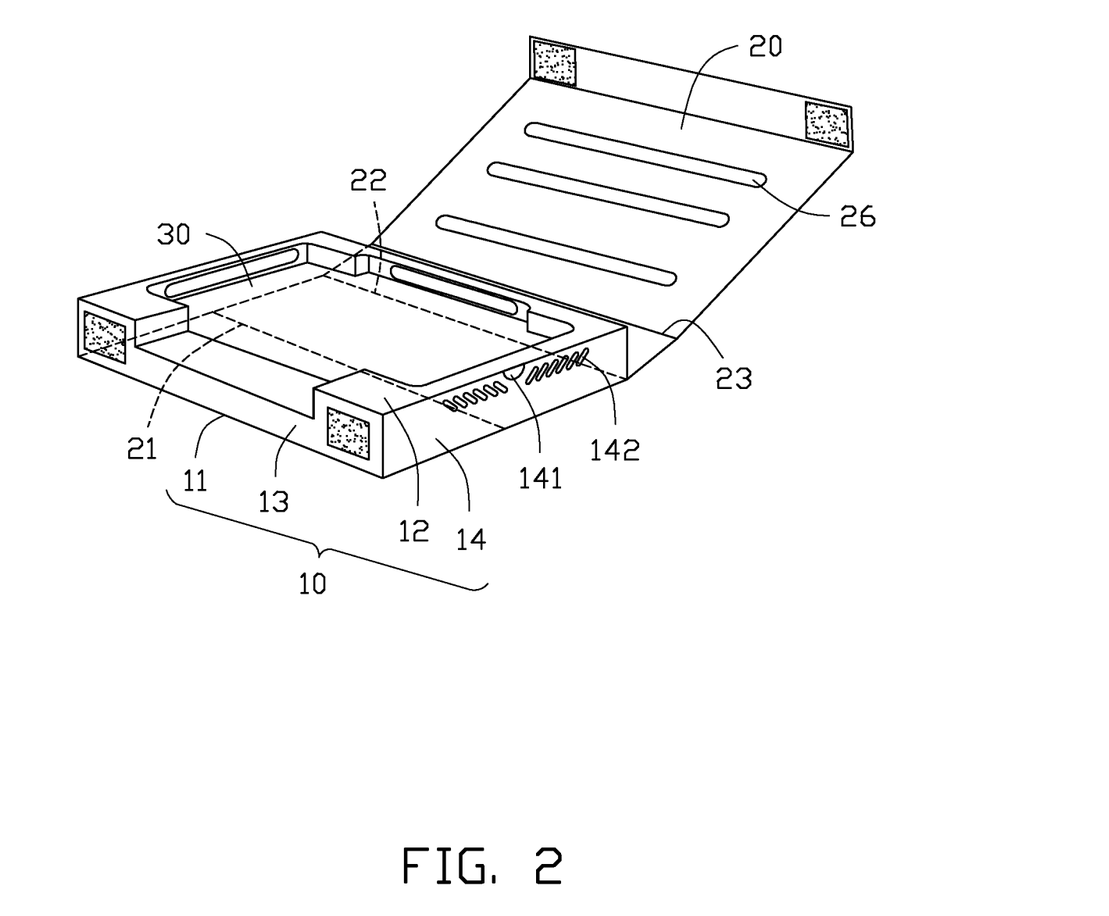
FIG. 2 is a schematic view of the packaging box of FIG. 1 in an open state.

FIG. 1 is a schematic view of an embodiment of a packaging box 100. The packaging box 100 is used to accommodate an electronic device 200 and accessories (e.g. an earphone, a charger, a data cable, an owner manual, and the like) when packaged, and also configured to provide a better viewing angle of the electronic device 200 when the electronic device is in use.

FIGS. 2 to 5 show that the packaging box 100 includes a box 10, a main cover 20 connected to the box 10, and a support 30 received in the box 10. The support 30 is configured to receive the electronic device 200 in a manner similar to a conforming tray. The main cover 20 covers the box 10 to package the electronic device 200. The box 10 and the main cover 20 can be made of transparent material, hardboard, plastic board, or other suitable material. In this exemplary embodiment, the box 10 and the main cover 20 are made of corrugated board.

Figure 3:
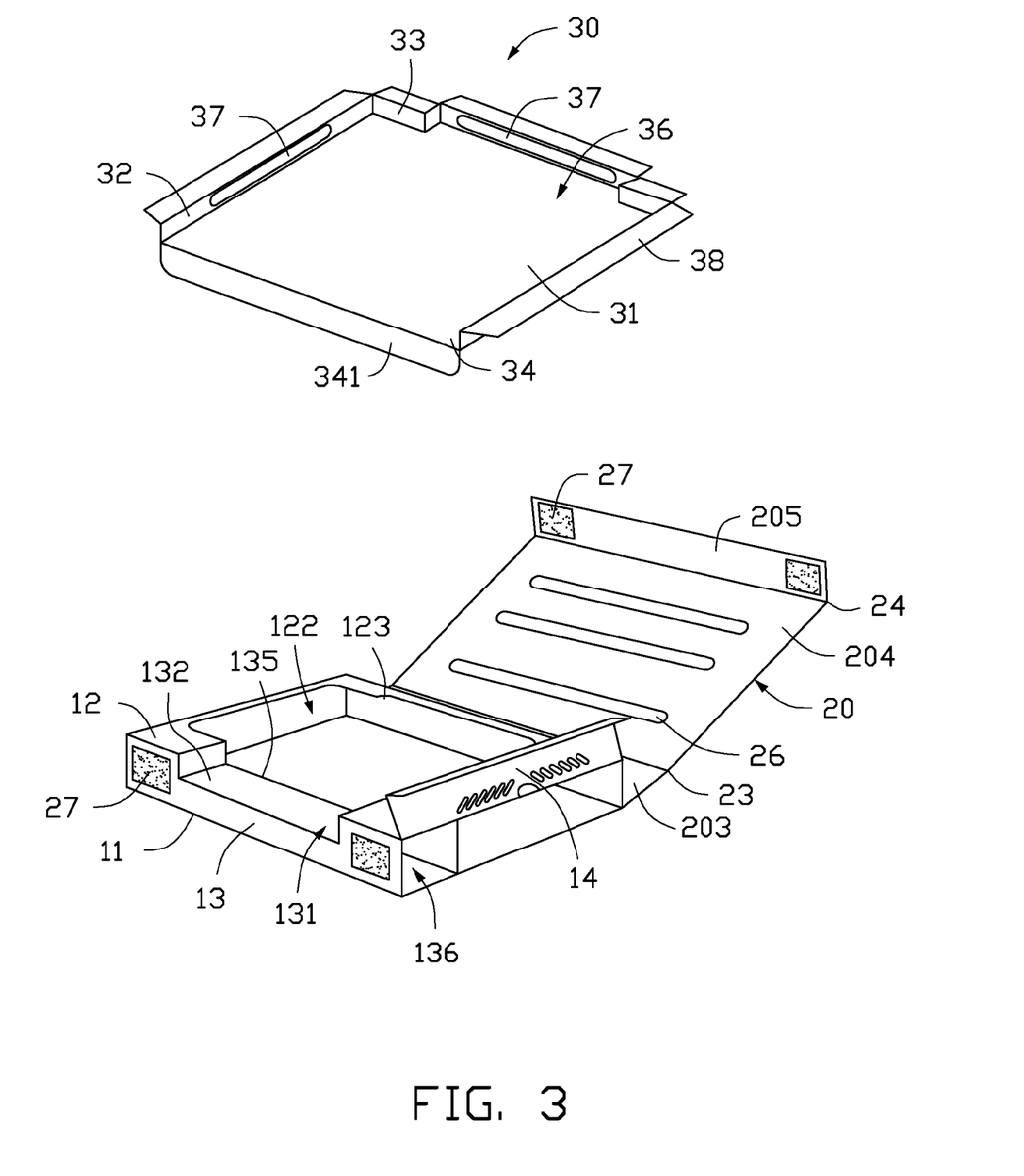
FIG. 3 is a dissembled view of the packaging box of FIG. 1.

The box 10 is substantially a hollow cube. The box 10 includes a bottom surface 11, a top surface 12 opposite to the bottom surface 11, and two opposite side surfaces 13 interconnecting the bottom surface 11 and the top surface 12. A first receiving space 122 is defined in a substantially middle portion of the top surface 12. An indent 123 is defined in the top surface 12 at a first side of the first receiving space 122. A step 131 opposite to the indent 123 is defined in the top surface 12 through one of the side surfaces 13 at a second side of the first receiving space 122. The indent 123 and the step 131 communicate with the first receiving space 122.

A connecting board 132 is received in the step 131 and is substantially parallel to the bottom and top surfaces 11, 12. A separating board 135 is positioned between the first receiving space 122 and the step 131, and is substantially parallel to the side surfaces 13. The side surface 13 defining the step 131, the connecting board 132, the separating board 135, and a portion of the bottom surface 11 cooperatively define a second receiving space 136 configured to receive the accessories.

Figure 4:
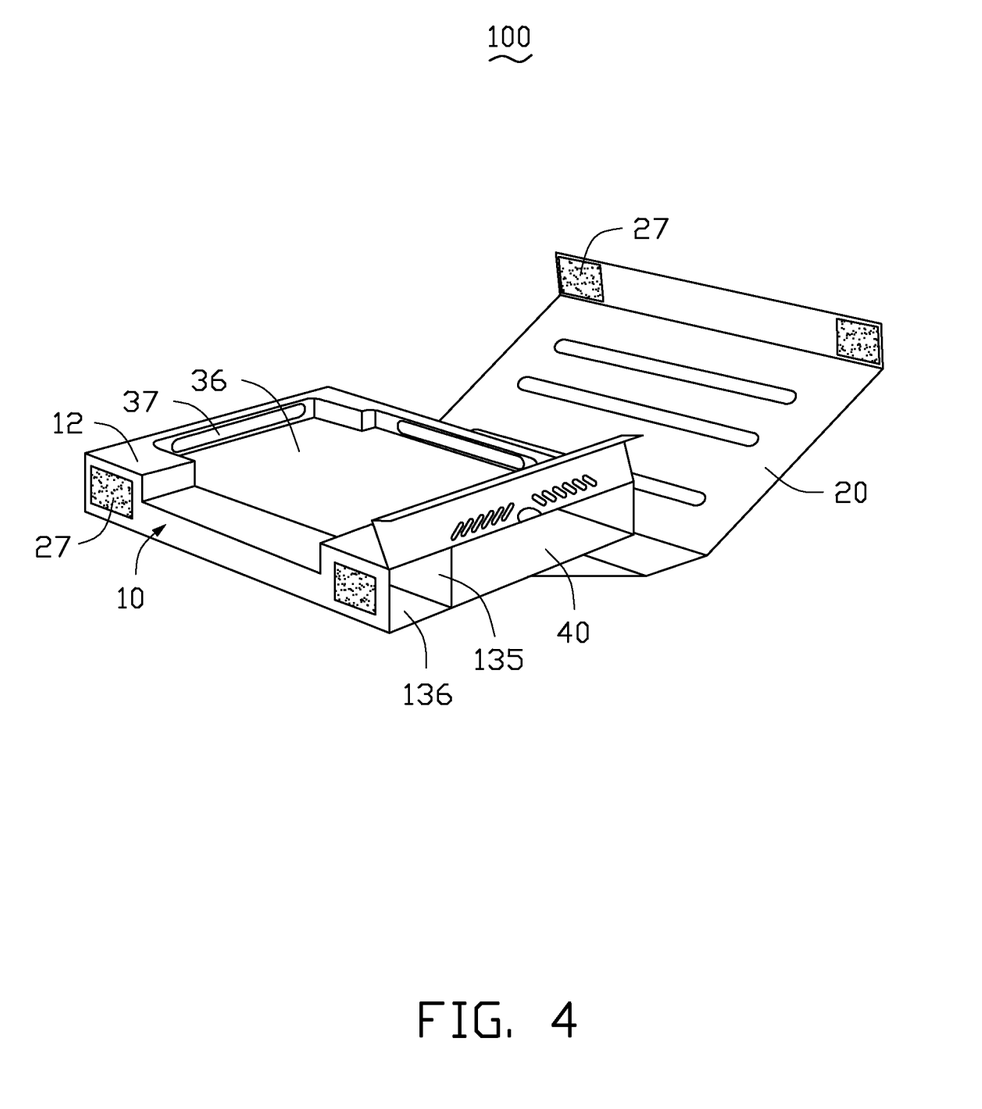
FIG. 4 is a schematic view of the packaging box of FIG. 1 with a side cover opened.
Figure 5:
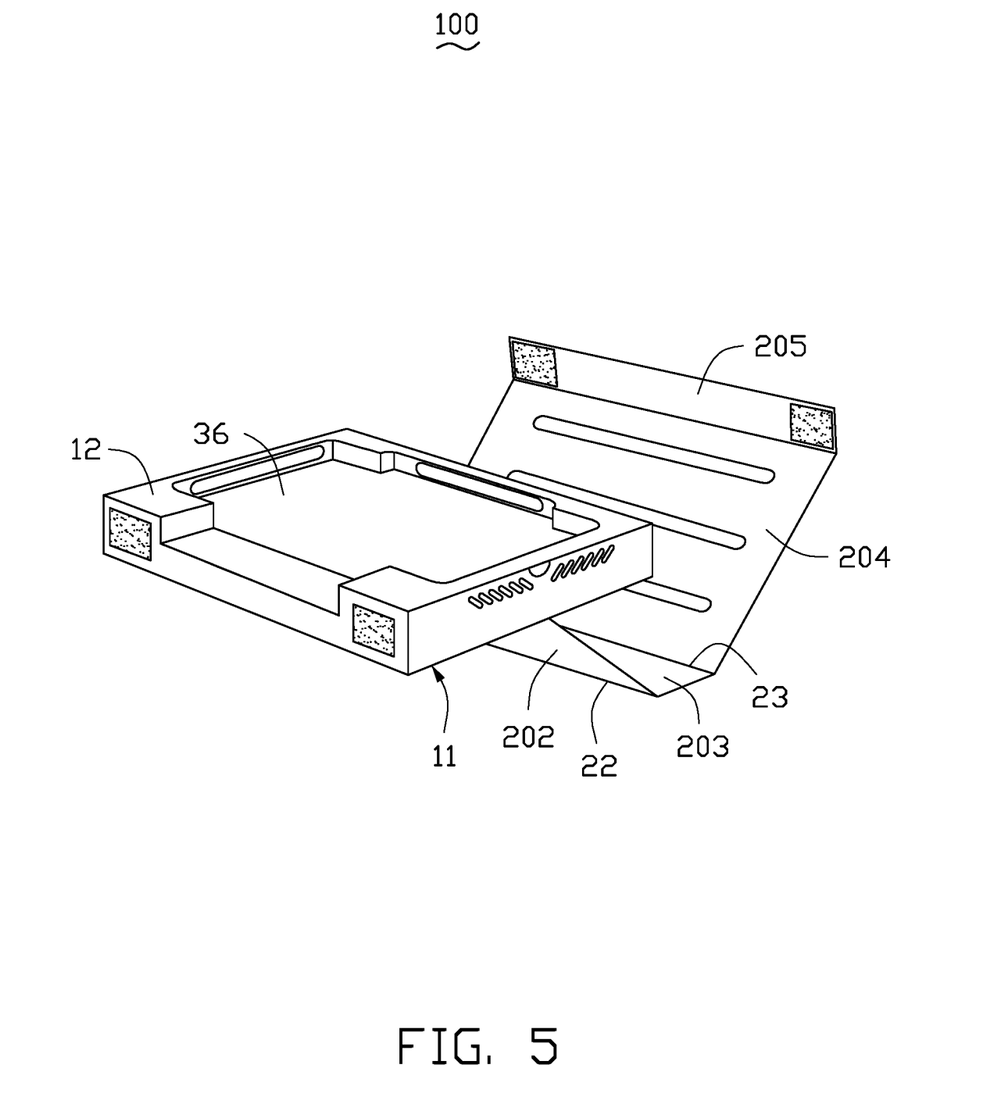
FIG. 5 is a schematic view of the packaging box of FIG. 1 with a main cover folded.

The box 10 further includes a side cover 14 connected to an end portion of the top surface 12. The side cover 14 is foldable to cover or uncover an end of the box 10. A through hole 141 is defined in a middle portion of the side cover 14. An external data cable can extend through the through hole 141 to electrically connect to the electronic device 200 received in the box 10. A plurality of sound holes 142 is defined in the side cover 14 at two sides of the through hole 141. The electronic device 200 received in the box 10 can output sound from the sound holes 142.

Figure 6:
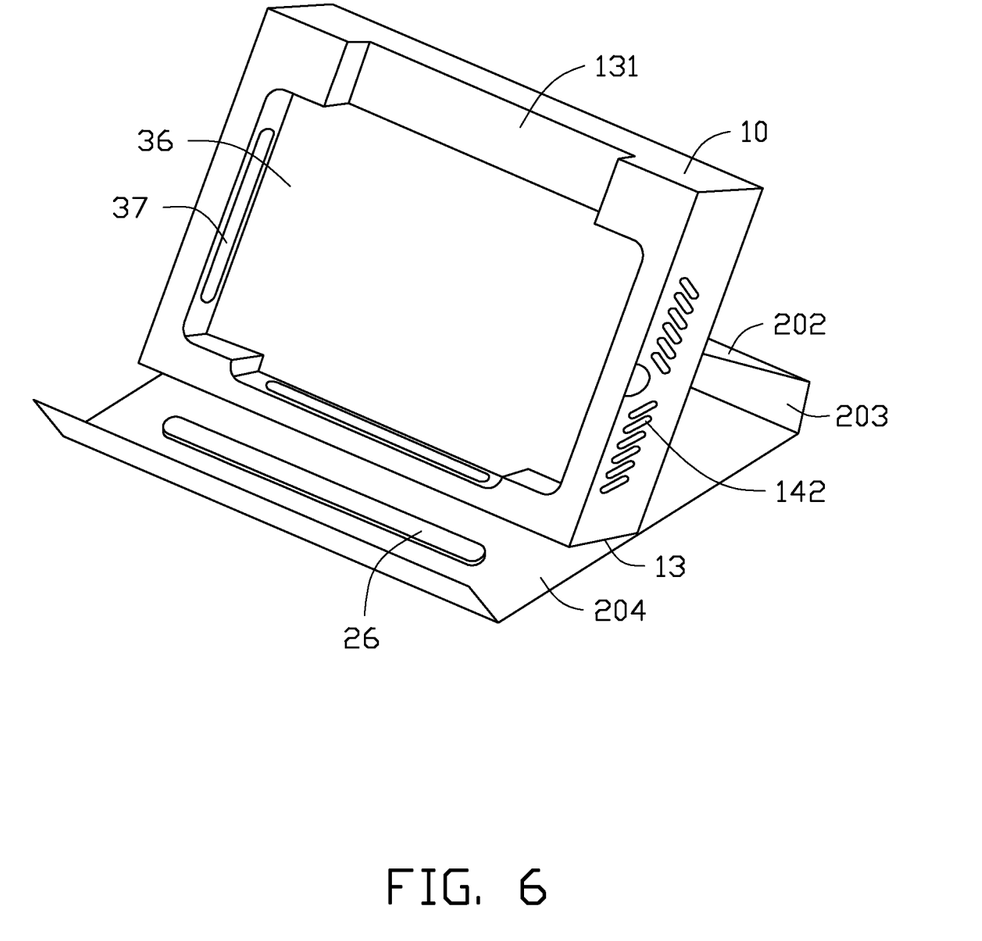
FIG. 6 is a schematic view of the packaging box of FIG. 1 with a box of the packaging box supported by the main cover.
Figure 7:
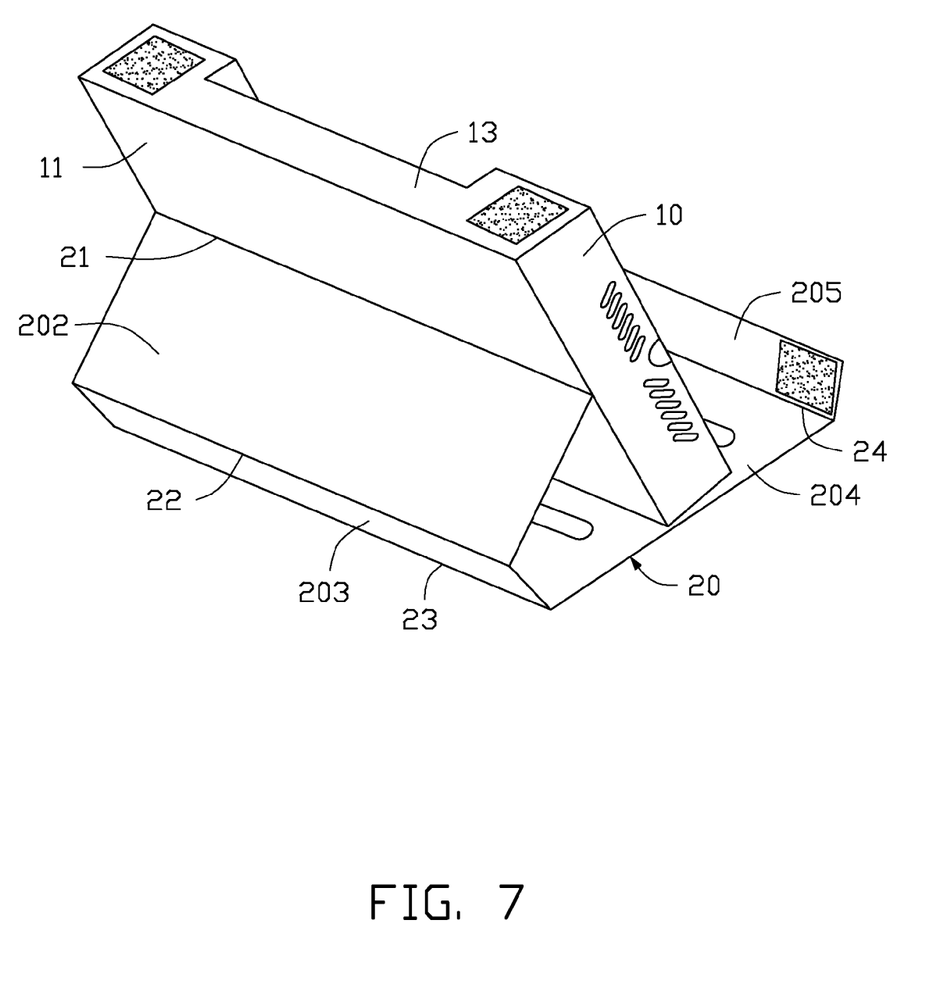
FIG. 7 is similar to FIG. 6, but shows the packaging box from another aspect.

FIGS. 6 and 7 show that the main cover 20 is a substantially flat board including a first board 202, a second board 203, a third board 204, and a fourth board 205. A first foldable edge 22 is formed between the first board 202 and the second board 203. A second foldable edge 23 is formed between the second board 203 and the third board 204. A third foldable edge 24 is formed between the third board 204 and the fourth board 205. The first, second, and third foldable edges 22, 23, 24 are substantially parallel to each other. The first/second, second/third, and third/fourth boards 202/203, 203/204, 204/205 are foldable along the first, second, and third foldable edges 22, 23, 24, respectively. A connecting edge 21 of the first board 202 is connected to a substantially middle portion of the top surface 12. The first board 202 is foldable relative to the bottom surface 11.

The second board 203 and the fourth board 205 correspond to the side surfaces 13. The third board 204 corresponds to the top surface 12. When packaging the box 10 with the main cover 20, the main cover 20 can be folded, such that the first board 202, the second and fourth boards 203, 205, and the third board 204 cover the bottom surface 11, the side surfaces 13, and the top surface 12, respectively (as shown in FIG. 1).

In this exemplary embodiment, a plurality of fixing members 27 is attached to the fourth board 205 and the side surface 13 defining the step 131, so that the fourth board 205 can be attached to the side surface 13 defining the step 131. The fixing members 27 can be Velcro, magnetic members, or other suitable attaching mechanism.

The main cover 20 can also be folded to support the box 10 at a suitable viewing angle, such that an angle is formed between the first board 202 and the bottom surface 11, and one of the side surfaces 13 corresponding to the second board 203 resists against the third board 204 (as shown in FIG. 7).

In this exemplary embodiment, a plurality of ribs 26 protrudes from a surface of the third board 204 facing the box 10. The viewing angle of the box 10 can be adjusted by moving the side surface 13 corresponding to the second board 203 to different ribs 26.

FIG. 3 shows that the support 30 includes a bottom wall 31, two opposite first sidewalls 32, and a second sidewall 33 connected to the first sidewall 32. The first sidewalls 32 and the second sidewall 33 surround edges of the bottom wall 31 to cooperatively define a receiving chamber 36. A side of the support 30 opposite to the second sidewall 33 defines an opening 34 communicating with the receiving chamber 36. Each first sidewall 32 and the second sidewall 33 define through slots 37. The support 30 further includes a plurality of first fixed boards 38 extending substantially perpendicularly from edges of the first sidewall 32 and the second sidewall 33 opposite to the bottom wall 31. The first fixed boards 38 extend along a direction away from the receiving chamber 36. A second fixed board 341 extends substantially perpendicularly from an edge of the bottom wall 31 at the opening 34.

In assembly, the support 30 is received in the first receiving space 122. The opening 34 is aligned with the step 131. The first fixed boards 38 are fixed to the top surface 12. The second fixed board 341 is fixed to the separating board 135. A sound chamber 40 is cooperatively defined between the bottom wall 31 and the box 10. The through slots 37 communicate with the sound chamber 40. In other embodiments, the support 30 can be omitted, such that the receiving chamber 36 can be directly defined in the box 10.

Figure 8:
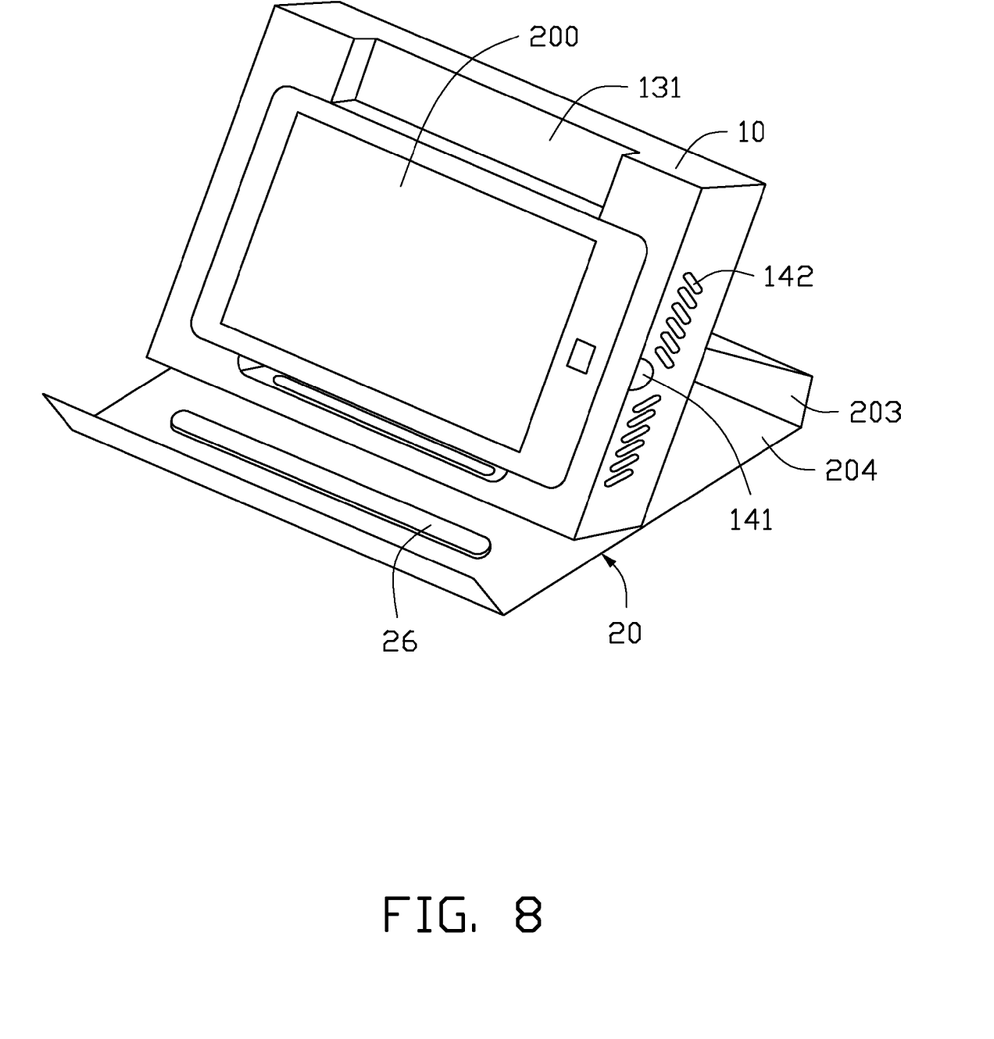
FIG. 8 is a schematic view of the packaging box of FIG. 6 with an electronic device received in the packaging box in a first orientation.

To package the electronic device 200 in the packaging box 100, the electronic device 200 is received in the receiving chamber 36 in a first orientation (i.e. a landscape orientation as shown in FIG. 8). The main cover 20 is folded to cover the box 10. The first board 202, the second and fourth boards 203, 205, and the third board 204 are attached to the bottom surface 11, the side surfaces 13, and the top surface 12, respectively. The fourth board 205 is fixed to the side surface 13 defining the step 132 so that the electronic device 100 is packaged in the box 10. Furthermore, the second receiving space 136 and the sound chamber 40 can be used to receive the accessories. The side cover 14 can be folded to open or close the second receiving space 136 and the sound chamber 40.

Figure 9:
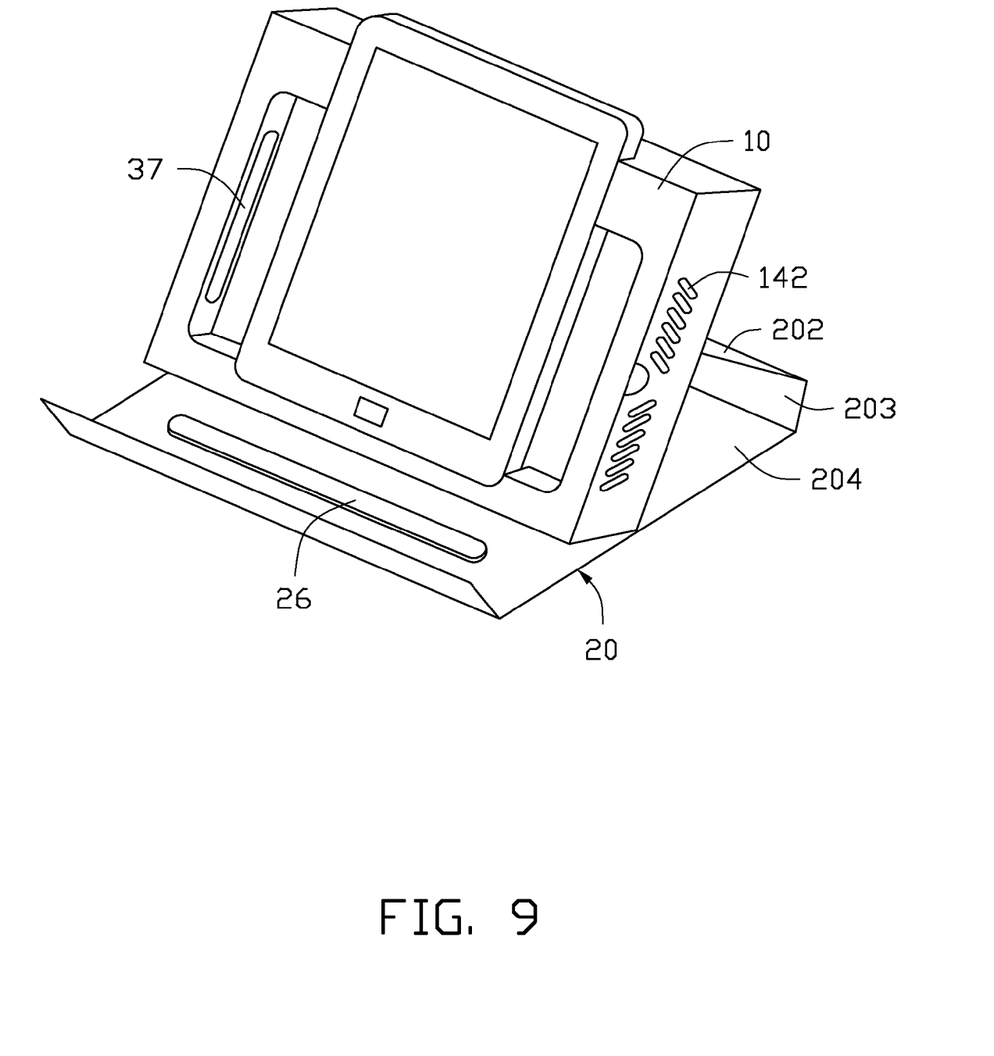
FIG. 9 is similar to FIG. 8, but shows the electronic device received in the packaging box in a second orientation.

FIGS. 8 and 9 show the packaging box 100 with the electronic device 200. The main cover 20 is opened and folded to expose the electronic device 200. An angle is formed between the first board 202 and the bottom surface 11. The side surface 13 corresponding to the second board 203 resists against the third board 204. Thus, the box 10 is in an inclined state, and the electronic device 200 received in the receiving chamber 36 can be viewed at a suitable viewing angle. The viewing angle (i.e. an inclined angle of the box 10) of the electronic device 200 can be adjusted by moving the side surface 13 corresponding to the second board 203 to different ribs 26.

Furthermore, speakers of the electronic device 200 can be aligned with the through slots 37 of the first sidewalls 32. Sound can be input to the sound chamber 40 from the through slots 37, and output from the sound holes 142. Therefore, the support 30 will not negatively influence the sound from the electronic device 200.

In addition, the electronic device 200 can be received in the receiving chamber 36 in a second orientation (i.e. a portrait orientation as shown in FIG. 9) and partially received in the step 131. When the electronic device 200 is out of power, the data cable can be conveniently connected to the electronic device 200 through the through hole 141 to charge the electronic device 200 without removing the electronic device 200 from the receiving chamber 36.

In summary, the packaging box 100 can be reused by the user. Thus, the packaging box 100 is eco-friendly. In addition, the packaging box 100 has a relatively simple structure and is easy to use.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A packaging box, comprising:
    a box defining a receiving chamber configured to receive an electronic device; and
    a main cover connected to the box, the main cover comprising a first board, a second board, and a third board, the first board connected to the second board and the second board connected to the third board;
    wherein the first board is connected to the box and foldable relative to the box, the first, second, and third boards are foldable relative to each other; the main cover is foldable to package the box and is also foldable relative to the box to support the box, wherein an angle is formed between the first board and the box and one side of the box abutting against the third board;
    wherein the box further comprises a sound chamber, the receiving chamber defines at least one through slot, the box defines a plurality of sound holes; sound output from an internal speaker of the electronic device is input to the sound chamber by the at least one through slot and output from the electronic device through the plurality of sound holes.

2. The packaging box of claim 1, wherein the main cover further comprises a plurality of ribs protruding from the third board facing the box, an inclined angle of the box is adjustable by moving the side of the box to the different ribs.

3. The packaging box of claim 1, wherein the main cover further comprises a fourth board connected to the third board and foldable relative to the third board, when the main cover is folded to package the box, the fourth board is attached to the box.

4. The packaging box of claim 3, further comprising a plurality of fixed members positioned on the fourth board and the box, wherein the fourth board is fixed to the box by the plurality of fixed members.

5. The packaging box of claim 1, further comprising a support received in the box, wherein the support comprises a bottom wall, two opposite first sidewalls, and a second sidewall connected to the first sidewalls; the first sidewalls and the second sidewall surround edges of the bottom wall to form the receiving chamber with an opening; the first sidewalls and the second sidewall define the least one through slot.

6. The packaging box of claim 5, wherein the support further comprises a plurality of first fixed boards perpendicularly extending from edges of the first sidewall and the second sidewall opposite to the bottom wall along a direction away from the receiving chamber and a second fixed board perpendicularly extending from edges of the bottom wall at the opening, the plurality of first fixed boards and the second fixed board are fixed to the box.

7. The packaging box of claim 6, wherein the box comprises a bottom surface, a top surface opposite to the bottom surface, and two opposite side surfaces interconnecting the bottom surface and the top surface, the top surface defines a first receiving space, the support is received in the first receiving space.

8. The packaging box of claim 7, wherein the top surface defines an indent and a step at two sides of the first receiving space, the box further comprises a connecting board received in the step and a separating board positioned between the first receiving space and the step; the one of the side surfaces with the step, the connecting board, the separating board and a portion of the bottom surface are connected to form a second receiving space.

9. The packaging box of claim 7, wherein the box further comprises a side cover connected to an end portion of the top surface; the side cover is foldable relative to the top surface to cover or uncover an end portion of the box.

10. A packaging box, comprising:
a box, the box defining a receiving chamber configured to receive an electronic device; and
a main cover connected to the box, the main cover comprising a first board, a second board, and a third board, the first board connected to the second board and the second board connected to the third board; wherein the first board is connected to the box and foldable relative to the box; the first, second, and third boards are foldable relative to each other; the main cover is foldable relative to the box to package the box and is also foldable relative to the box to support the box in an inclined state;
wherein the box further comprises a sound chamber, the receiving chamber defines at least one through slot, the box defines a plurality of sound holes; sound output from an internal speaker of the electronic device is input to the sound chamber by the at least one through slot and output from the electronic device through the plurality of sound holes.

11. The packaging box of claim 10, wherein the main cover further comprises a plurality of ribs protruding from the third board facing the box, an inclined angle of the box is adjustable by moving the side of the box to the different ribs.

12. The packaging box of claim 10, wherein the main cover further comprises a fourth board connected to the third board and foldable relative to the third board, when the main cover is folded to package the box, the fourth board is attached to the box.

13. The packaging box of claim 12, further comprising a plurality of fixed members positioned on the fourth board and the box, the fourth board is fixed to the box by the plurality of fixed members.

14. The packaging box of claim 1, further comprising a support received in the box, wherein the support comprises a bottom wall, two opposite first sidewalls, and a second sidewall connected to the first sidewalls; the first sidewalls and the second sidewall surround edges of the bottom wall to form the receiving chamber with an opening; the first sidewalls and the second sidewall define the least one through slot.

15. The packaging box of claim 14, wherein the support further comprises a plurality of first fixed boards perpendicularly extending from edges of the first sidewall and the second sidewall opposite to the bottom wall along a direction away from the receiving chamber and a second fixed board perpendicularly extending from edges of the bottom wall at the opening, the plurality of first fixed boards and the second fixed board are fixed to the box.

16. The packaging box of claim 15, wherein the box comprises a bottom surface, a top surface opposite to the bottom surface, and two opposite side surfaces interconnecting the bottom surface and the top surface, the top surface defines a first receiving space, the support is received in the first receiving space.

17. The packaging box of claim 16, wherein the top surface defines an indent and a step at two sides of the first receiving space, the box further comprises a connecting board received in the step and a separating board positioned between the first receiving space and the step; the one of the side surfaces with the step, the connecting board, the separating board and a portion of the bottom surface are connected to form a second receiving space.

18. The packaging box of claim 16, wherein the box further comprises a side cover connected to an end portion of the top surface; the side cover is foldable relative to the top surface to cover or uncover an end portion of the box.

* * * * *